(12) United States Patent
Moran et al.

(10) Patent No.: US 8,826,929 B2
(45) Date of Patent: Sep. 9, 2014

(54) CUTTER ASSEMBLY

(75) Inventors: James R. Moran, Madison, OH (US);
Ryan K. Wodrich, Medina, OH (US);
David L. Robison, Madison, OH (US)

(73) Assignee: Elster Perfection Corporation, Geneva, OH (US)

( * ) Notice: Subject to any disclaimer, the term of this patent is extended or adjusted under 35 U.S.C. 154(b) by 0 days.

(21) Appl. No.: 13/577,993

(22) PCT Filed: Feb. 10, 2011

(86) PCT No.: PCT/US2011/024272
§ 371 (c)(1),
(2), (4) Date: Aug. 9, 2012

(87) PCT Pub. No.: WO2011/100383
PCT Pub. Date: Aug. 18, 2011

(65) Prior Publication Data
US 2012/0312391 A1    Dec. 13, 2012

Related U.S. Application Data

(60) Provisional application No. 61/304,011, filed on Feb. 12, 2010.

(51) Int. Cl.
*B23B 41/08* (2006.01)

(52) U.S. Cl.
USPC ............ 137/15.14; 137/318; 29/890.11; 408/137; 30/93

(58) Field of Classification Search
USPC ............ 137/317, 318, 15.12–15.14; 408/101, 408/137; 30/93; 29/890.11
See application file for complete search history.

(56) References Cited

U.S. PATENT DOCUMENTS

| 2,839,075 | A | | 6/1958 | Mueller |
| 3,085,461 | A | | 4/1963 | Forman |
| 3,756,261 | A | * | 9/1973 | Minchhoff .............. 137/318 |
| 3,771,546 | A | | 11/1973 | Roos |
| 4,076,038 | A | | 2/1978 | Wynne |
| 4,258,742 | A | * | 3/1981 | Louthan et al. ........... 137/318 |

(Continued)

FOREIGN PATENT DOCUMENTS

EP    1069367 A1    1/2001

OTHER PUBLICATIONS

PCT/US2011/024272 International Search Report and Written Opinion, dated Apr. 2011.

(Continued)

*Primary Examiner* — Kevin Lee
(74) *Attorney, Agent, or Firm* — Baker & Hostetler LLP

(57) ABSTRACT

A tapping tee assembly and method is provided for fluidly connecting to a conduit. The tapping tee assembly includes a body having a conduit recess for receiving the conduit and further defining a passage having one end adjacent the conduit recess. A cutter is received in the passage and engages a threaded region of the passage for selective advancement and retraction within the passage upon rotation relative the body. The cutter comprises a first component with first and second ends and having a cutting edge at the first end for cutting through a side wall of the conduit to establish fluid communication between the main passage and the conduit. A second component is secured to the first component at the second end either by mechanically securing or molding the second component to the first component.

19 Claims, 7 Drawing Sheets

(56) References Cited

U.S. PATENT DOCUMENTS

| | | | |
|---|---|---|---|
| 4,541,758 A | 9/1985 | Frank et al. | |
| 5,076,318 A * | 12/1991 | Fedora | 137/317 |
| 5,122,021 A | 6/1992 | Medal | |
| 5,577,529 A * | 11/1996 | Katz | 408/101 |
| 5,732,732 A * | 3/1998 | Gross et al. | 137/318 |
| 6,260,573 B1 | 7/2001 | Lehmann et al. | |
| 6,758,237 B2 * | 7/2004 | Sichler et al. | 30/93 |
| 7,721,754 B2 * | 5/2010 | Knaus et al. | 137/318 |
| 2008/0099077 A1 | 5/2008 | Knaus | |

OTHER PUBLICATIONS

European Patent Application No. EP11742768: Supplementary European Search Report dated Nov. 21, 2012, 5 pages.

* cited by examiner

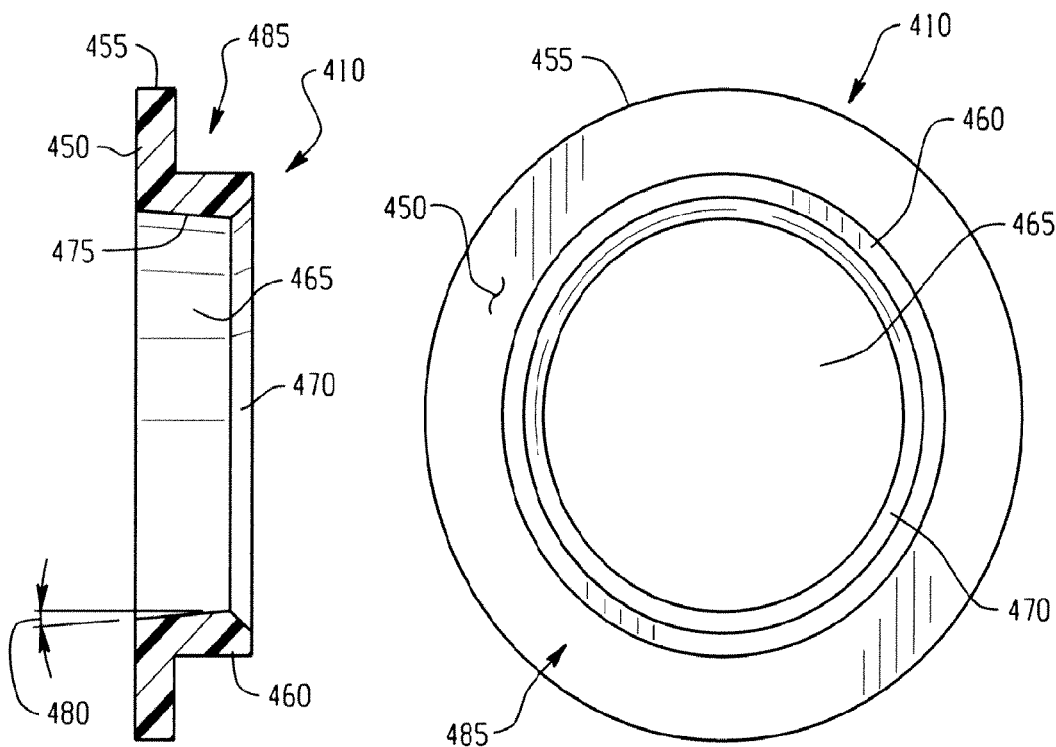
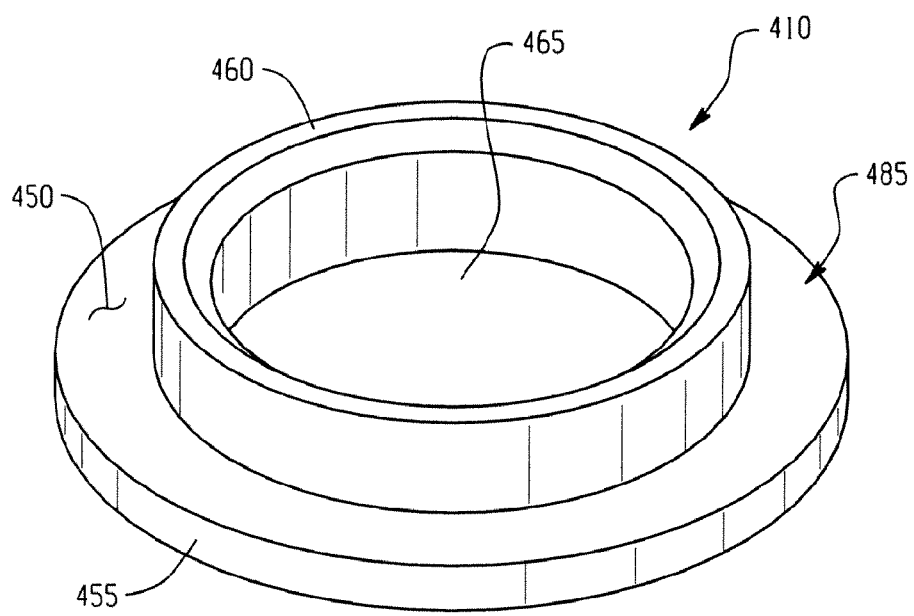
Fig. 7  Fig. 8  Fig. 9

CUTTER ASSEMBLY

BACKGROUND

The present disclosure generally relates to the art of tapping conduits, pipes or tube-like workpieces and more particularly to a leakproof tapping tee assembly for tapping into an existing plastic conduit (e.g., a gas main or a water main) to establish fluid communication between the plastic conduit and another, secondary conduit.

Polymer and plastic piping is used within many varying types of pipeline networks. For example, such piping is commonly employed throughout the United States in gas pipeline networks for delivering pressurized gas (e.g., natural gas) to homes and businesses. In Europe, such piping is commonly employed in water pipeline networks for delivering water to homes and businesses. There has also been an increased interest in the use of such piping in European gas pipeline networks. Whether for water or gas, or some other fluid or substance, the pipeline network employing polymer and/or plastic piping typically includes pipe mains, which are often buried, for conveying the carried fluid (e.g., water or gas) to various locations and service lines, which interconnect a home or business with a selected pipe main.

In particular, the pipe main is often an existing or previously installed main that continuously carries a fluid (i.e., a live main), the shutting down of which is highly discouraged and inconvenient. Tapping tees are frequently and advantageously used for connecting secondary conduits, such as service lines, to pipe mains, particularly when the secondary conduit is to be installed to a live main. A tapping tee can incorporate a drill-like or cutting tool with a mounting collar for allowing the tee to be positioned at any desired location along the main. Typically, the tee is first attached to the main by using a split collar arrangement or, alternately, the tee may be fused to the main. Thereafter, the cutting tool is advanced through the sidewall of the main to open a fluid passage between the main and the tapping tee. The tapping tee often includes appropriate structure for more easily and conveniently connecting to the secondary conduit, wherein such connection is often completed prior to tapping the main (i.e., advancing the cutting tool to establish fluid communication). One advantage of such a tapping tee is that it is not necessary to actually sever the entire main, or otherwise interrupt service provided through the main, in order to interconnect the tee. Rather, the tapping tee requires only that a hole be drilled into the main in order to provide for fluid communication therewith.

Tapping tees have been commercially successful and are able to provide a leakproof seal with the mains to which the tapping tees are connected in both gas and water applications. While ably providing leakproof sealing with their respective mains, both upon initial installation and over time (e.g., the service life of the main), known tapping tees include cutting tools manufactured from solid bar stock. This machining of the cutting tools increases the costs associated with the known tapping tee. Accordingly, there is a need for an improved cutting tool for a tapping tee that can reduce the costs of prior art tapping tees.

BRIEF DESCRIPTION

According to one aspect of the present disclosure, a tapping tee assembly is provided for fluidly connecting to a conduit. The tapping tee assembly includes a body defining a conduit recess for receiving the conduit in close relation relative to the body and further defining a main passage having one end adjacent the conduit recess. The main passage extends from the one end outwardly away from the recess. A cutter is received in the main passage and threadedly engaged with a threaded region of the main passage for selective advancement and retraction within the main passage upon rotation relative to the body. The cutter has a first component with first and second ends, and a cutting edge at the first end for cutting through a side wall of the conduit to establish fluid communication between the main passage and the conduit. A second component is secured to the first component at the second end and includes an externally threaded region.

According to one exemplary embodiment, the second component includes an insert encapsulated therein for providing strength to the second component. To secure the second component to the first component, a portion of the second component is positioned within the first component. At least one lock located on the first component engages the second component thereby securing the first component to the second component.

In another embodiment, a method of forming a cutter for a tapping tee assembly is provided. The method includes the steps of stamping a first component having a first and second end, and providing an annular cutting edge at the first end. The first component is configured to affix a second component at the second end. The method of molding the second component with an externally threaded region for cooperation with a main passage includes securing the second component within the first component.

In one embodiment, a seal is configured to seal the first component and the second component.

BRIEF DESCRIPTION OF THE DRAWINGS

FIG. 7 is a cross-sectional view of a retaining member.

FIG. 8 is a top view of the retaining member.

FIG. 9 is a perspective view of the retaining member.

DETAILED DESCRIPTION

Figure 1:
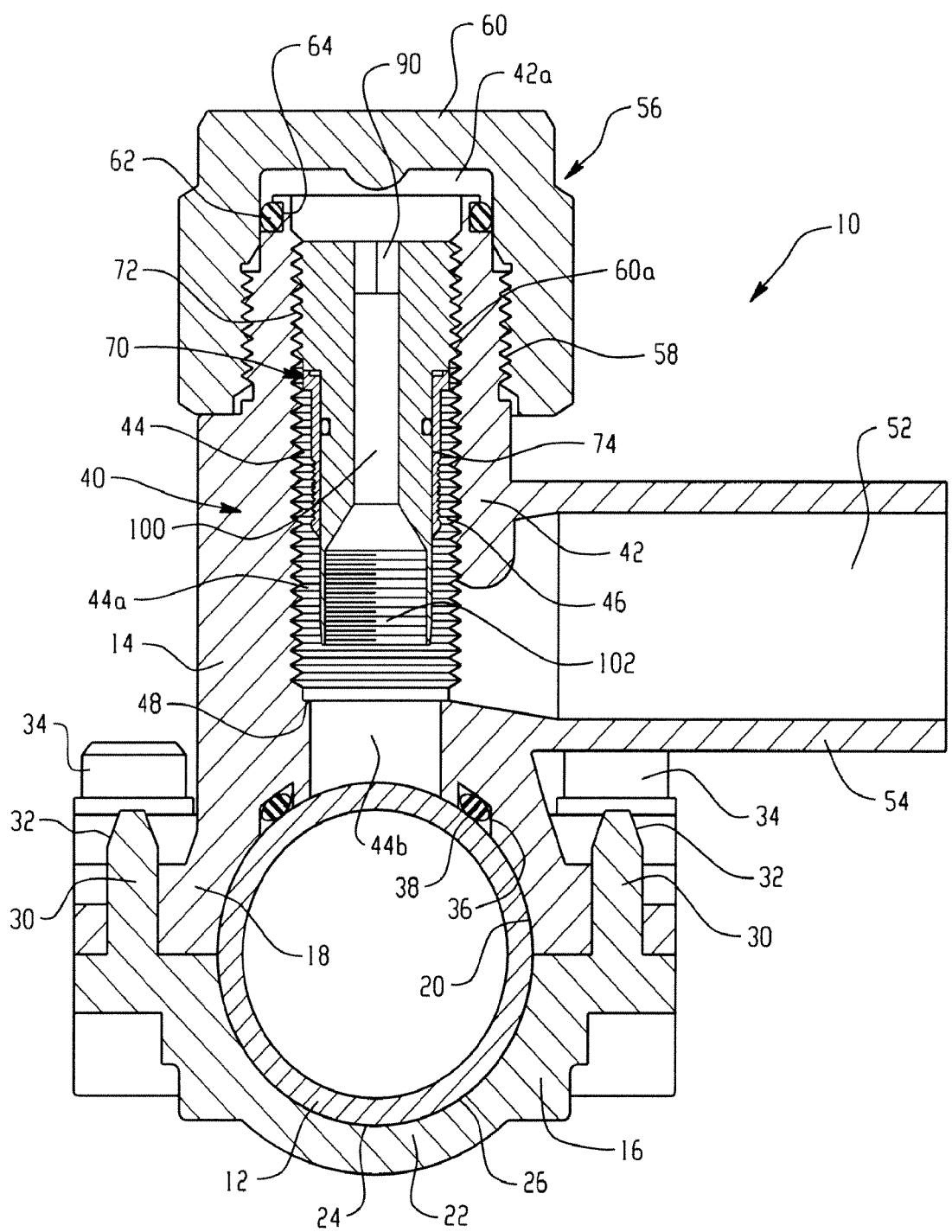
FIG. 1 is a cross-sectional view a known tapping tee assembly secured to a main conduit.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 illustrates a known tapping tee assembly 10 for fluidly connecting to a conduit including a body that can be securely clamped to an associated tubular member or main conduit 12 (e.g., a water or gas main). The known tapping tee assembly 10 employs a split ring or collar arrangement that includes a first or upper clamp portion 14 and a second or lower clamp portion 16, which together form the body. The upper clamp portion 14 includes an arcuate saddle section 18 having a generally semi-cylindrical inner surface 20, also referred to herein as a curvilinear recess or area, adapted to closely receive or conform to a portion of the cylindrical outer surface of the main conduit 12. Similarly, lower portion 16 has an arcuate saddle section 22 having an inner, semi-cylindrical surface 24, also referred to herein as a curvilinear recess or area, adapted to closely receive or conform to a portion of the outer circumferential surface of the main conduit 12. By the surfaces 20, 24, the body 12, 14 defines a conduit recess 26 that is configured to receive the main conduit 12 in close relation relative to the body.

In one arrangement, a fastening arrangement is used to secure the first and second body portions 14, 16 together and provide clamping engagement about the outer surface of the main conduit 12 when the conduit is disposed in the conduit recess 26 between the portions 14, 16. The fastening arrangement includes a plurality of fastening structures 30 formed with the lower clamp portion 16, for example, that extend upwardly through corresponding tapered apertures 32 defined in the upper clamp portion 14. Alternately, the structures 30 could be formed with the upper clamp portion 14 and received through apertures defined in the lower clamp portion 16. In either case, caps 34 can be threadedly received on a distal end (not shown) of each fastening structure 30 that extends through its corresponding aperture 32. Tightening of the caps 34 on the threaded distal ends of the corresponding fastening structures 30 securely clamps the tapping tee assembly 10 about the circumference of the tubular main conduit 12.

To assist in providing a leak-free connection, the first body portion 14 includes an annular recess 36 defined in the surface 20. A seal 38, such as an o-ring type of seal, is received in the recess 36 for sealing engagement with the main conduit 12, particularly after the fastening arrangement is used to secure the body 14, 16 of the tapping tee assembly to the main conduit 12 and more particularly about an external surface portion of the main contact that is cut or "tapped" in a manner to be described below.

The body 14, 16 of the known tapping tee assembly 10 preferably further includes a tapping tee tower 40 that extends away from the conduit recess 26. As shown, the tower is included on and formed integrally with the upper clamp portion 14 in a preferred configuration of the tapping tee assembly. The tower 40 includes a branch 42 that extends approximately normally outward, for example, relative to a longitudinal axis of the main conduit 12 when the tapping tee assembly 10 is installed on the main conduit. The body 14, 16 has a first or main passage 44 defined therein. In particular, the passage 44 has one end adjacent the conduit recess 26 and extends outwardly away from the recess 26 through the tower 40, and particularly through the branch 42. In addition, the passage 44 includes an internal threaded portion 46 extending axially over at least a portion of an axial extent of the passage 44. The main passage 44 is generally aligned with the annular recess 36 such that the recess is positioned radially outwardly relative to the main passage. An internal shoulder 48 is provided in the main passage 44.

The upper and lower clamp portions 14, 16 are typically formed of a polymer or plastic material, as is the conduit 12 onto which the portions 14, 16 are secured. The integral fastening structures 30 can be formed of the same material as the lower clamp portion 16. The main passage portions 44*a*, 44*b* can be formed conventionally.

Communicating with the main passage 44 is a branch passage 52, which is defined by the tower 40 and particularly by a second branch 54. The branch 54 extends generally perpendicularly from the branch 42 in a preferred arrangement, although other conformations are also possible. The branch passage 52 is connected to the main passage 44 for fluidly connecting to another component. More specifically, the branch passage 52 is fluidly connected to main passage 44. The branch passage 52 is adapted for communication with a service line or other individual hookup (not shown), details of which are well known in the art and require no further description herein.

The tapping tee assembly 10 further includes a cap assembly 56 for selectively and sealingly closing an upper, open end of the main passage 44 opposite the end adjacent the conduit recess 26. More particularly, the tower 40 usually includes an exterior threaded region 58 adjacent an upper end 42*a* of the first branch for threadedly receiving a cap 60 thereon. A seal, such as o-ring seal 62, can also be provided as part of the cap assembly 56 and is disposed within a circumferential groove 64 defined in the branch 42 axially between the upper end 42*a* and the threaded region 58. The seal 62 cooperates with an inner bore wall 60*a* of the cap to provide a fluid-tight seal between the cap and body.

Figure 2:
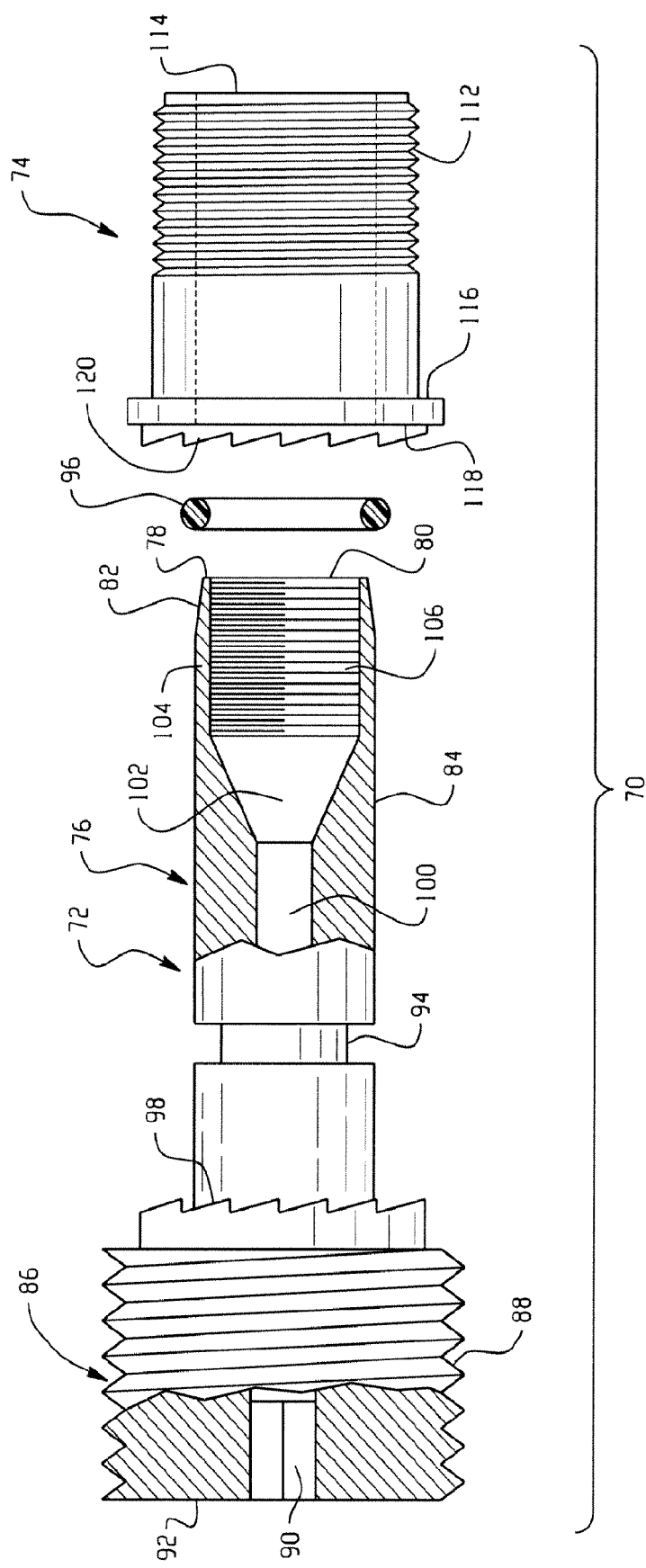
FIG. 2 is an enlarged view (in partial cross section) of the separate components that cooperate to define a known tapping assembly of the tapping tee assembly of FIG. 1.

With additional reference to FIG. 2, the known tapping tee assembly 10 also includes a tapping apparatus or cutter assembly 70 comprising a threaded cutter 72 and a sleeve 74. The threaded cutter 72 includes a first portion 76 having an annular cutting edge 78 provided at a first end 80. The cutting edge 78 can be partially defined by a circumferential taper 82 provided at the first end 80 in an exterior surface 84 of the first portion 76. The cutting edge 78 is configured for cutting through a side wall of the conduit 12 to establish fluid communication between the main passage 44 and the conduit 12. Cutting through a sidewall of the main conduit 12 ultimately establishes fluid communication between the main conduit and the branch passages 44, 52 so that fluid in the main conduit is thereby provided to a service line attached to the second branch 54.

The cutter 72 further includes a second portion 86 (typically having a greater dimension than the first radial portion 76) having an externally threaded region 88. As shown in FIG. 2, the first portion 76 and the second portion 86 generally comprise a unitary member machined from solid bar stock and is capable of withstanding forces applied thereon. In particular, the threaded cutter 72 and the sleeve 74 are received in the main passage 44 when the tapping tee assembly 10 is fully assembled. The threaded cutter 72 is threadedly engaged with the threaded region 46 of the main passage 44 for selective advancement and retraction within the main passage 44 upon rotation relative to the body 14, 16. The threaded region 88 has a first preselected thread pitch that cooperates with the internally threaded portion 46 of the main passage 44. Upon rotation of the threaded cutter 72 relative to the body 14, 16, the cutter is either axially advanced toward or retracted from the main conduit 12 depending on the direction of rotation. A tool receiving recess 90, such as a hex-shaped tool socket that receives an appropriate tool (not shown) to effect the rotation of the cutter, is preferably formed in a second end 92. Interposed between the first and second ends 80, 92, a peripheral or circumferential groove 94 is defined in the exterior surface 84 of the first portion 76. The groove 94 is dimensioned to receive a resilient seal member 96, such as an o-ring, which is adapted for providing an interference, sealing fit with the sleeve 74. The second portion 86 also includes a first ratchet element 98 that provides for selective driving engagement between the cutter 72 and the sleeve 74 in one direction of rotation and relative slipping in the opposite direction of rotation, i.e., a one-way drive or ratchet arrangement.

A fluid communication passage 100 extends axially through the cutter 72 from the first end 80 to the second end 92. Adjacent the first end 80, a recess portion 102 of the passage 100 is diametrically expanded to fowl a thinned wall section 104 which is adapted to, and axially sized to, receive cutout portions or coupons created by the cutting edge 78 as the cutter proceeds through the side wall of the main passage. Internal threads 106 can be provided along the portion 102 extending radially inwardly from the thinned wall section 104 for assisting in retaining coupons received within the recess portion 102. In particular, the recess portion 102 is configured to retain a conduit coupon 130 after the cutter 72 cuts through the conduit 12.

The sleeve 74 is a generally tubular or hollow cylindrical member having external threads 112 extending axially inwardly from a first end 114 and a radially extending shoulder 116 at or adjacent a second end 118. When the cutter assembly 70 is fully assembled, the sleeve 74 is received around the cutter 72 and forms an interference fit therewith via the o-ring 96. The threads 112 advance into and threadedly grip the sidewall of the main conduit 12 after the cutting edge 78 of the cutter 72 has removed a portion of the main conduit sidewall, typically referred to as a "coupon" (i.e., the conduit coupon 130). The threads 112 preferably extend axially along the sleeve 74 a dimension sufficient to engage along the entire depth or thickness of the sidewall.

A second cooperating ratchet element 120 is provided at the second end 118 of the sleeve 74. The ratchet element 98 of the cutter 72 and ratchet element 120 of the sleeve 74 are each defined by a series of sloped or ramped shoulders (i.e., sawtooth shaped). The ramped shoulders are circumferentially spaced apart and provide for a one-way driving engagement between the cutter 72 and sleeve 74. Thus, as the cutter is advanced by an associated tool (not shown), the ratchet elements 98, 120 cooperate with one another to provide driving rotatable and axial movement to the sleeve 74 as the cutter 72 is rotated in a first direction (e.g., advancing direction relative to the main conduit 12). Rotation of the cutter 72 in a second, opposite direction (e.g., retracting relative to the main conduit 12) allows the tapered surfaces to slide one over the other and thus no axial movement is imparted to the sleeve by the cutter.

The external threads 112 on the sleeve 74 have a second preselected thread pitch that is different or varies from the thread pitch on the threads 88 of the cutter 72. Specifically, a greater number of threads per inch can be provided on the cutter 72 than on the sleeve 74. This relationship requires a lesser number of turns to advance the sleeve 74 a predetermined distance than are required to axially advance the cutter 72 the same distance or dimension.

As indicated previously, typically the tapping apparatus or cutter assembly 70 including the cutter 72 and sleeve 74 are separately machined from solid bar stock. This manufacturing process increases the cost associated with the tapping tee assembly 10, particularly the cutter assembly 70. In order to reduce the cost associated with the cutter assembly, the present disclosure provides an improved cutter 200 that can be used in combination with the conventional sleeve 74 of the tapping tee assembly 10.

As shown in FIGS. 3-6, the cutter 200 comprises a first or cutting component 202 and a second or molded component 204 affixed to the first component 202. The first component 202 is preferably formed from a rigid material such as a stamped, punched steel. The second component 204 on the other hand is preferably formed of a polymer or plastic material, such as a high-performance thermoplastic, for example injection mold grade polyphenylene sulfide (PPS), although, it should be appreciated that similar materials for the first and second components are also contemplated.

Figure 6:
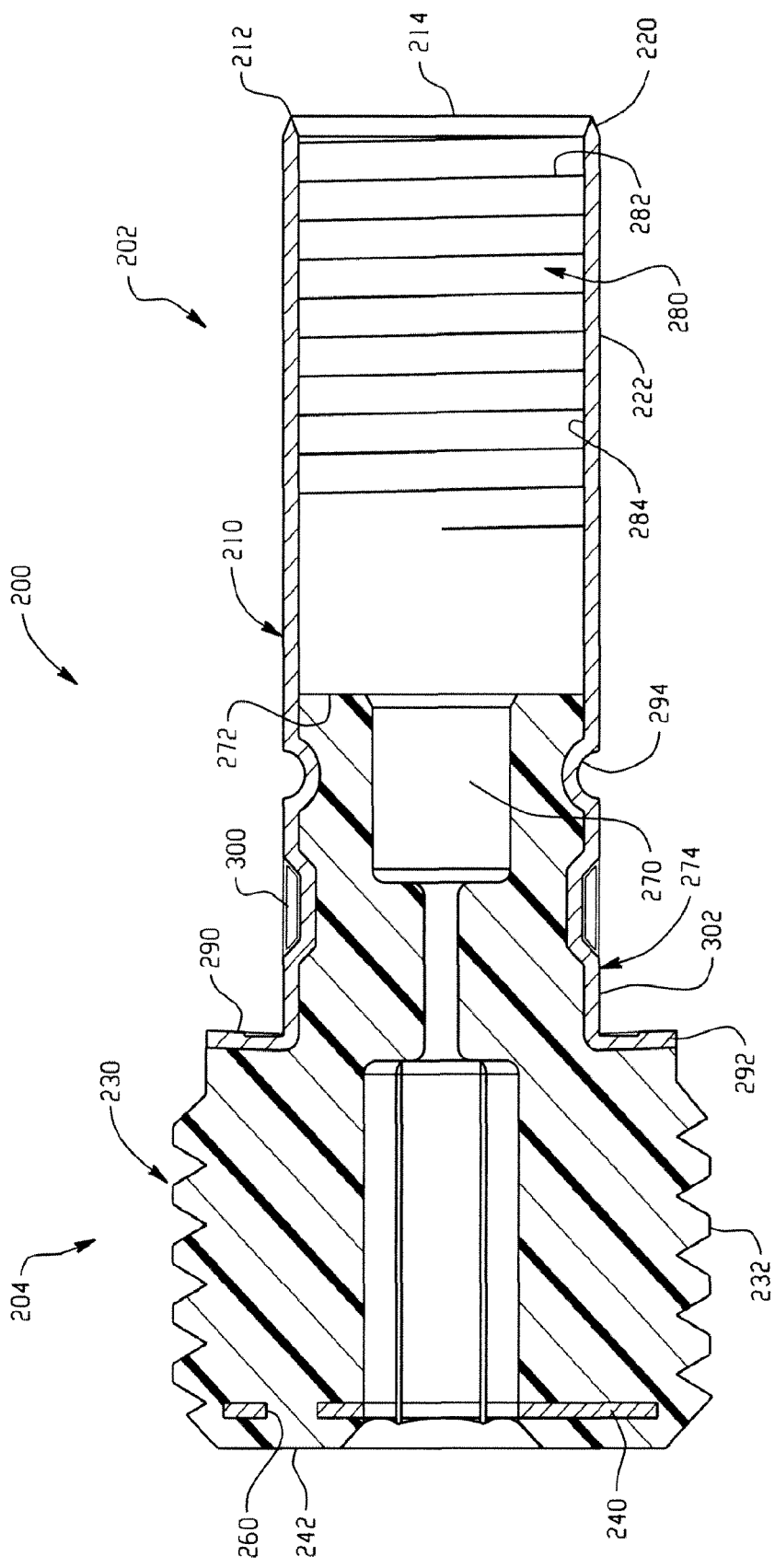
FIG. 6 is a cross-sectional view of the cutter assembly of FIG. 3 taken generally along line A-A of FIG. 4.

With particular reference to FIG. 6, and similar to cutter 72, the first component 202 of cutter 200 includes a first portion 210 having an annular cutting edge 212 provided at a first end 214. The cutting edge 212 is partially defined by a circumferential taper 220 provided at the first end 214 that merges into an exterior surface 222 of the first portion 210. The cutting edge 212 is configured for cutting through a side wall of the conduit 12 (see FIG. 1) to establish fluid communication between the main passage 44 and the conduit 12 in substantially the same manner as described above.

The second component 204 of the cutter 200 includes a first portion 230 having an externally threaded region 232. The threaded region 232 has a first pre-selected thread pitch that cooperates with the internally threaded portion 46 of the main passage 44 of the tapping tee assembly 10 (see FIG. 1). Upon rotation of the threaded cutter 200 relative to the body of the tapping tee assembly, the cutter 200 is either axially advanced or retracted from the main conduit 12 depending on the direction of rotation.

Figure 3:
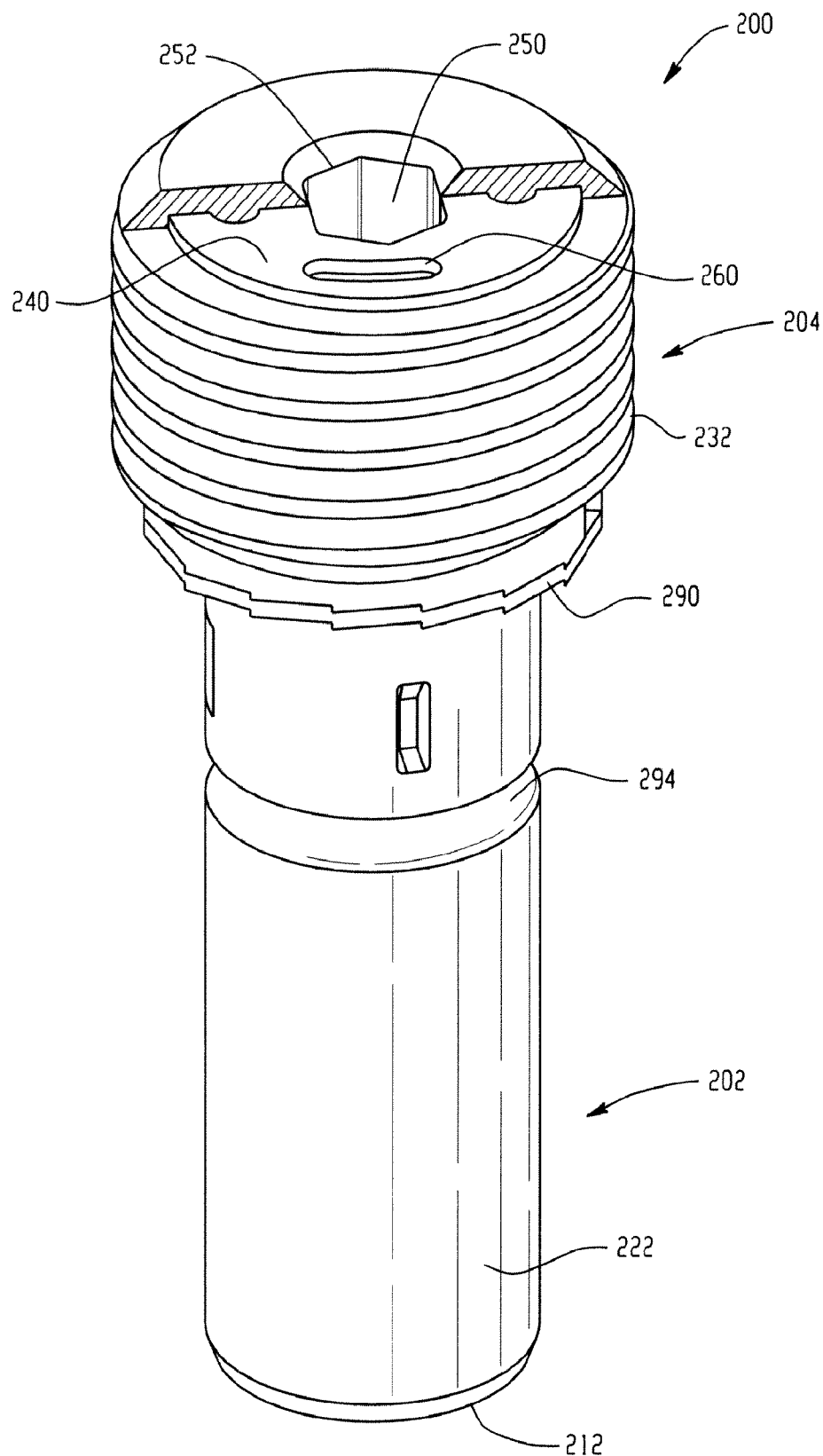
FIG. 3 is a perspective view of a cutter assembly with a portion thereof in section according to one aspect of the present disclosure.
Figure 5:
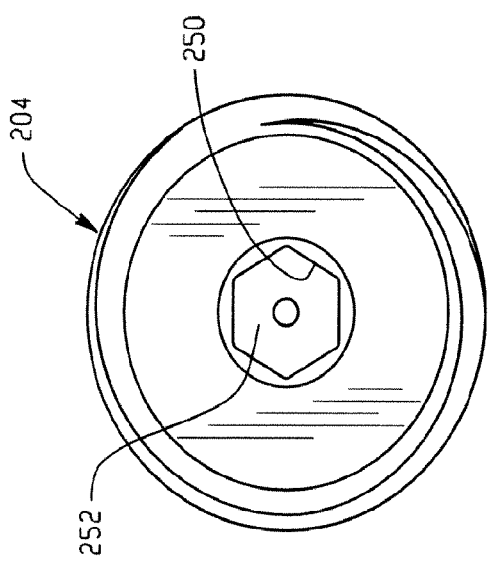
FIG. 5 is a top plan view of the cutter assembly of FIG. 3.

The cutter 200 further includes an insert 240 which is spaced from a first end 242 of the second component 204. The insert 240 is preferably in the shape of a disk and is formed from steel in a preferred arrangement, although alternative materials for the disk are contemplated. As shown in FIGS. 3 and 5, the disk 240 includes a tool receiving opening 250 which is in registry with a tool receiving recess 252 that extends axially through at least a portion of the second component 204. The opening 250 and the tool receiving recess 252 are generally hex-shaped, for example, for receiving an appropriate tool (not shown) to cause the rotation of the cutter 200. Because the tool imparts a rotational force on the second component 204, the disk provides increased torque/strength to the second compound 204 as the cutter 200 is either axially advanced or retracted from the main conduit 12. As will be described in greater detail below, the disk 240 further includes at least one opening or slot for securing the disk 240 to the second component 204 by allowing the molded material to extend therethrough. In the exemplary embodiment, the disk 240 includes four circumferentially spaced slots 260, although more or less than four slots are also contemplated and may be used without departing from the scope and intent of the present disclosure.

The tool receiving recess 252 is in communication with a fluid communication passage 270 which extends axially through the second component 204 from the first end 242 to a second end 272 which is received within a second portion 274 of the first component 202. The fluid communication passage 270 is in communication with an axial recess 280 defined by the generally cylindrical shaped first portion 210. The recess 280 is adapted, and axially sized, to receive cutout portions or coupons created by the cutting edge 212. Internal threads 282 are provided along a portion of the recess 280 extending radially inward from the interior surface 284 of the recess 280 for retaining coupons received within the recess 280.

As shown in FIG. 6, a first ratchet element 290 is located at a second end 292 of the first component 202. Similar to the cutter 72, the first ratchet element 290 provides for a selected drive between the cutter 200 and the second ratchet element 120 provided at the second end 18 of the sleeve 74 (see FIG. 2). As the cutter 200 is advanced by and associated to, the ratchet elements 290, 120 cooperate with one another to provide driving rotatable and axial movement to the sleeve 74 as the cutter 200 is rotated in a first direction. Rotation of the cutter 200 in a second, opposite direction allows the ratchet elements 290, 120 to slide one over the other and thus no axial movement is imparted to the sleeve 74 by the cutter 200. Located between the first and second ends 214, 292 of the first component 202, a circumferential groove 294 is defined in the exterior surface 222 of the second radial portion 274. The groove 294 receives a resilient seal member 96 such as an o-ring, which is adapted for providing an interference, sealing fit with the sleeve 74.

Figure 4:
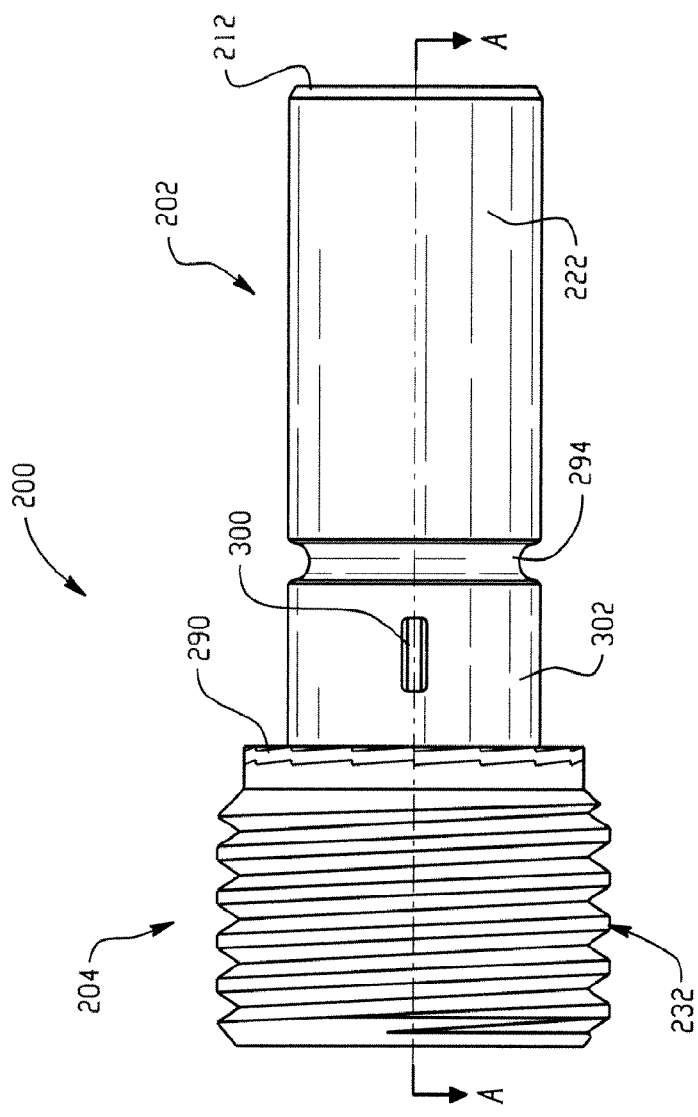
FIG. 4 is a side elevation view of the cutter assembly of FIG. 3.

The second portion 274 further includes at least one lock or sometimes referred to as a depressed region 300 which is interposed between the second end 292 and the groove 294. In the depicted exemplary embodiment, the first component 202 includes four circumferentially spaced-apart locks 300, although, this specific number is not required. As shown in FIGS. 4 and 6, each lock 300 extends longitudinally on a surface 302 of the second radial portion 274 and includes a portion which extends radially inwardly. As will be discussed in more detail below, the radially, longitudinally and circumferentially spaced locks 300 are configured to secure the externally threaded second component 204 to the first component 202.

Figure 10:
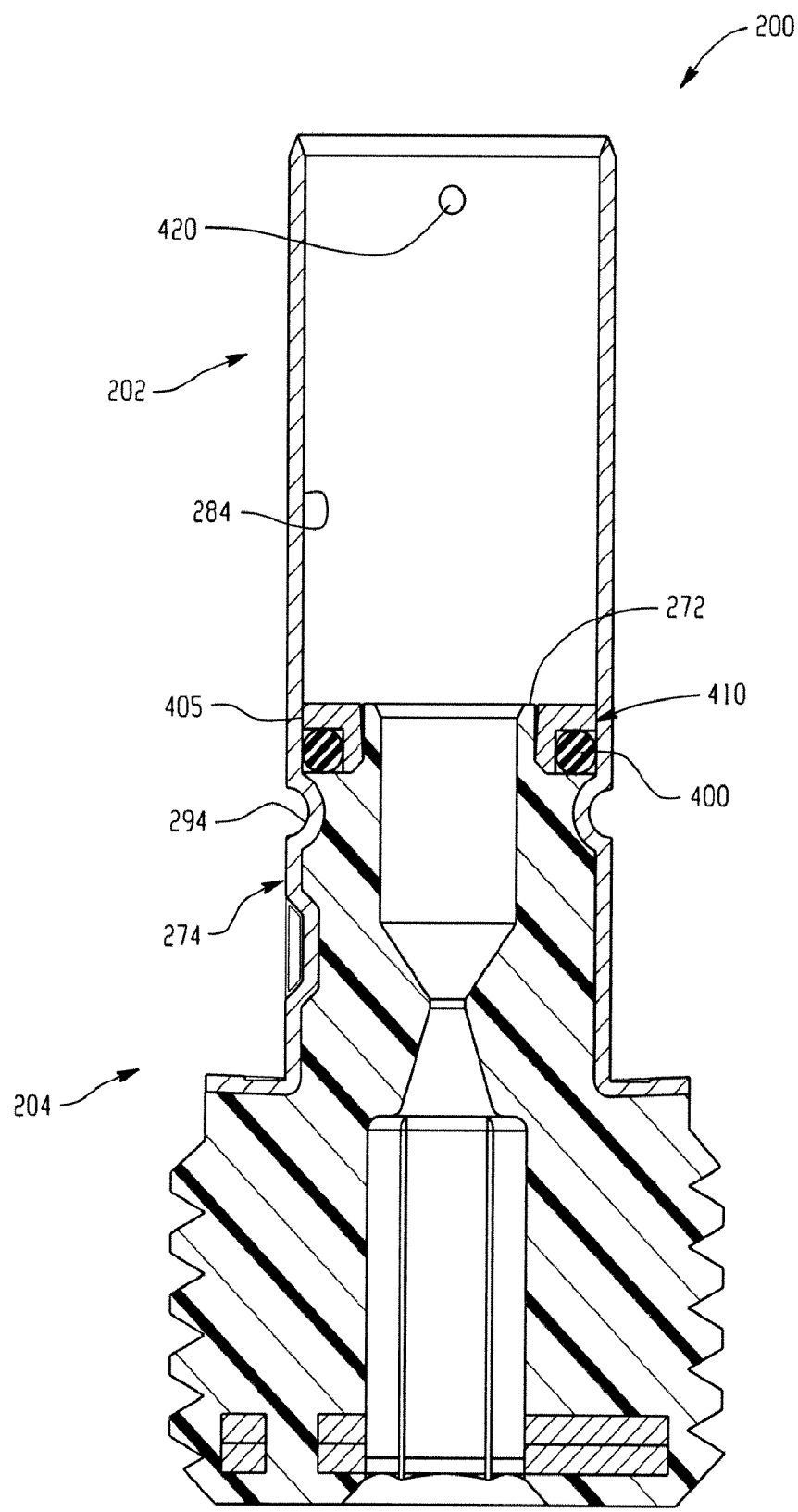
FIG. 10 is a cross sectional view of the cutter assembly with a seal and the retaining member.

In one embodiment, as illustrated in FIG. 10, the second portion 274 further includes a resilient seal 400 which is interposed between the groove 294 and the second end 272 of the second component 204. More particularly, the resilient seal 400 is located along inner surface 405 within the first component 202 where the first component abuts the second component 204. The illustrated resilient seal 400 is preferably an o-ring (see FIGS. 7-9) sized to sealingly abut surface 284 of axial recess 280 in the first component 202. The o-ring is physically supported in place by a circumferential retainer 410 that is configured and dimensioned for receipt within the axial recess 280 and aligned with the second end 272 of the second component 204. The retainer 410 illustrated in FIGS. 7-9 is preferably a generally circular body 450 with a circumferential edge 455 that is operative to substantially engage recess surface 284. The circular body 450 is attached to an axial wall 460 generally normal to the circular body 450 and shaped to define an aperture 465. The axial wall 460 includes a circumferential tapered edge 470 and an inner side, aperture, or central opening 475. The inner side 475 can be generally perpendicular to the circular body 450 or may include a slightly angled orientation relative to a perpendicular plane 480 of the circular body 450 as illustrated in FIG. 7. The circular body 450 and axial wall 460 define a retaining space 485 that is shaped to support the o-ring 400 while the o-ring 400 provides a seal at the shared surface 405. In use, the resilient seal 400 prevents gas or moisture from traveling along an undesired pathway between the first component 202 and the second component 204.

According to one exemplary embodiment to form the cutter 200, the second component 204 is formed first and then secured to the first component 202. More particularly, the insert 240 is held on a core pin, for example, and the second component 204 is injection molded about the insert 240 such that the second component encapsulates the insert 240. The insert 240 is securely retained within the second component 204 via the slots 260 formed in the insert which slots allow the molten plastic to flow through the insert 240 thereby securing the insert 240 within the second component 204 once the plastic solidifies or cures. Once formed, at least a portion of the second component 204 is positioned within the first component 202. The locks 300 securely retain by way of mechanical engagement the second component 204 to the first component 200. According to one aspect, the locks 300 are crimped to the second component in a known manner, the radially inwardly extending portion of each lock 300 engaging the second component 204. This ensures that the first component 202 is secured to the second component 204 so that the first component does not become inadvertently disconnected from the second component as the cutter 200 is either axially advanced or retracted from the main conduit 12.

An alternative exemplary method for forming the cutter 200 is also provided. According to this exemplary method, the insert 240 is held on a core pin together with the first component 202. The plastic for forming the second component 204 is then injection molded about the insert 240 and at least partially within the first component 202 such that the second component is located beneath the locks 300 and the groove 294. In this method of forming the cutter 200, the groove 294 securely retains the second component 204 within the first component 202. More particularly, the insert 240 is held on a first end of the core pin and the stamped first component 202 is held on a second end of the core pin. The pin including the insert and the second radial portion 274 of the first component 202 is disposed between mating components of an insert mold. The mold components are designed with respective molded regions for forming the second component 204. The molded regions allow the insert 240 to be encapsulated by the plastic material which forms the second component 204. The molded regions also define the second end 272 of the second component 204 which is received within the first component 202. Injected molding material fills the molding regions and subsequently solidifies to define the second component 204. In this exemplary method, the molding process securely attaches the second component 204 to the first component 202 by injecting the molded material about the locks 300 and the groove 294.

One embodiment for forming the cutter 200 comprises the use of the retainer seal 400 interposed between the first component 202 and the second component 204. The retainer seal 400 is preferably an o-ring configured to seal between the first component 202 and the second component 204. The o-ring 400 is retained by a circumferential retainer 410 (FIGS. 7-9) dimensioned for receipt within inner surface 284 of the first component. The retainer 410 is preferably positioned or located in surface 284 of axial recess 280 during the forming of the second component 204. The plastic is injected within the first component 202 and is molded about the o-ring and retainer 410 as illustrated in FIG. 10. Here, plastic totaling material is received about the o-ring 400 and at least partially within the aperture 465 to securely fix the o-ring seal 400 and retainer 410 within the cutter and also advantageously seal this region from any potential gas bleed-by along the interface between the metal and molded portions.

Optionally, the o-ring 400 and retainer 410 can be fitted within the axial recess 280 of the first component 202 after the second component 204 has been formed. The second molded component 204 is molded to accept the o-ring seal 400 and retainer 410 at the second end 272 after being secured within the first component 202.

The insert molding processes described above are illustrative examples. Substantially, any insert molding process can be employed to form the cutter 200. By insert molding the second component of the cutter 200, the cost associated with manufacturing the cutter 200 is significantly reduced as compared to cutter 72. Further, one skilled in the art will appreciate that the operation of the cutter 200 together with the sleeve 74 is similar to the operation of the cutter 72 with the sleeve 74 described above.

In use, the body 14, 16 of the tapping tee assembly 10 is secured to the conduit 12 with the conduit received in the conduit recess 26. Once the tapping tee assembly 10 is secured to the main conduit 12 (as shown in FIG. 1), a conventional leak test can be conducted on the tapping tee assembly 10 by pressurizing from the second branch passage 54.

Provided no leaks are discovered during the conventional leak test, the cap 60 is removed. The assembled tapping apparatus 70 is predisposed in the main passage 44, particularly the upper portion 44a of the main passage, or may at this time be placed therein. The annular cutting edge 212 of the cutter 200 is rotated to advance the cutter 200 and the sleeve 74 along the main passage 44 toward the main conduit 12 by means of the threaded engagement between the second component 204 of the cutter 200 and the threaded portion 46 of the main passage 44. More specifically, a conventional tool imparts a rotational force on the cutter 200 in a first direction with respect to the branch 42 to advance the cutter toward the main conduit 12. Continued rotation and advancement by the cutter ultimately causes the cutter to tap or cut through the conduit 12 to form an aperture through the sidewall of the main conduit 12. Upon completion of the main conduit cutting process, the conduit 12 is fluidly connected to the main passage 44 and a plug or coupon removed from the main conduit 12 is also circumferentially retained within the cutter recess 280 with the threads 282 facilitating such retention. In addition to the threads 282, the cutter recess 280 may optionally be provided with a retention opening 420 to aid in retaining the coupon. As illustrated in FIG. 10, the retention opening 420 is located about the interior surface 284 of the axial recess 280 in spaced relation from the first end 214. The retention opening 420 is suitably dimensioned to receive the coupon within the axial recess 280. That is, the retention opening 420 receives a portion of the coupon after the cutter 200 has protruded through the conduit whereby the portion of the coupon expands into the retention opening 420 thereby acting as a detent that assists with long-term retention of the coupon.

Still further continued rotation and advancement of the cutter 200 then causes the sleeve 74 to forcibly enter the conduit 12. Due to the slightly larger diameter of the sleeve and threads 112, the sleeve 74 threadedly engages with the sidewall of the conduit 12 via the threads 112 as the sleeve is forcibly advanced into the conduit by the cutter 72. This threaded relationship ensures a leak-proof connection between the sleeve 74 and the conduit 12 (i.e., fluid is prevented from passing between the exterior threaded surface of the sleeve 74 and the conduit sidewall to which the sleeve is threadedly engaged).

Axial advancement of the sleeve 74 is limited by the internal shoulder 48 of the tower 40. More particularly, the sleeve 74 is advanced in the direction of the main conduit 12 until the sleeve shoulder 116 engages the internal shoulder 48. This provides a positive feedback to the user or installer that the sleeve 74 is fully in position and that the main conduit coupon has been cut from the main conduit 12. Moreover, the shoulder 116 cooperates with the internal shoulder 48 in the tapping tower 40 to limit advancement of the sleeve first end 114 into the main conduit 12. In this way, only a minimal amount of the sleeve 74 extends into the fluid path defined by the main conduit 12. If not already installed, associated piping can now be joined to the second branch 54 and then the cutter 200 can be retracted from the conduit 12 and separated from the sleeve 74.

It will be appreciated that various of the above-disclosed and other features and functions, or alternatives thereof, may be desirably combined into many other different systems or applications which are also intended to be encompassed by the following claims.

The invention claimed is:

1. A tapping tee assembly for fluidly connecting to an associated conduit comprising:
   a body having a conduit recess for receiving the associated conduit;
   a passage extending through the body having one end adjacent the conduit recess;
   a cutter received in the passage and threadedly engaged with a threaded region of the passage for selective advancement and retraction within the passage upon rotation relative to the body, the cutter having a first component with first and second ends and having a cutting edge at the first end and mechanically secured to a second component having a threaded region at the second end; and
   a sleeve received around the cutter, the sleeve including external threads adapted to thread into a sidewall of the conduit.

2. A tapping tee assembly of claim 1 wherein the threaded cutter further comprises a passage through the first component and second component.

3. The tapping tee assembly of claim 1 further including a one-way drive connection having an engaging surface between the sleeve and the cutter to selectively engage one another so that the sleeve is threaded into engagement with the sidewall and retained in place when the cutter is retracted in the body.

4. The tapping tee assembly of claim 3 wherein the engaging surface is located between the first component and the sleeve.

5. A cutter for a tapping tee assembly comprising:
   a first component including a cutting edge for cutting through a side wall of a conduit to establish fluid communication between a main passage and the conduit;
   a second component integrally molded to the first component, the second component includes an externally threaded region, a portion of the second component is positioned within the first component; and
   at least one lock located on the first component to engage the second component thereby preventing the first component separating from the second component.

6. The cutter of claim 5, wherein the first component is a stamped metal.

7. The cutter of claim 5, wherein the first component includes an annular cutting edge at a first end having a cutter recess configured to retain a coupon from the conduit.

8. The cutter of claim 7, wherein the cutter recess includes internal threads adapted to engage and retain the coupon.

9. The cutter of claim 7, wherein the first component further includes a retention opening configured to retain the coupon.

10. A cutter for a tapping tee assembly comprising:
    a first component including a cutting edge for cutting through a side wall of a conduit to establish fluid communication between a main passage and the conduit;
    a second component integrally molded to the first component, the second component includes an externally threaded region, a portion of the second component is positioned within the first component, and wherein an insert is encapsulated by the second component for providing strength to the second component.

11. The cutter of claim 10, wherein the insert is spaced from a first end of the second component and has a shape of a disc with a tool receiving opening.

12. A cutter for a tapping tee assembly comprising:
a first component including a cutting edge for cutting through a side wall of a conduit to establish fluid communication between a main passage and the conduit;
a second component integrally molded to the first component, the second component includes an externally threaded region, a portion of the second component is positioned within the first component, and
a seal between the first component and the second component.

13. The cutter of claim 12 wherein the seal includes an O-ring configured to seal between of the first component and the second component.

14. The cutter of claim 13 wherein the O-ring is secured by a retainer.

15. A method of forming a cutter for a tapping tee assembly, the method comprising the steps of:
stamping a first component having a first end with an annular cutting edge and a second end;
molding the second component with an externally threaded region for cooperation with a main passage; and
securing the second component within the first component by mechanically locking the second component to the first component.

16. A method of forming a cutter for a tapping tee assembly, the method comprising the steps of:
stamping a first component having a first end with an annular cutting edge and a second end;
molding the second component with an externally threaded region for cooperation with a main passage;
securing the second component within the first component; and
providing an insert within the second component.

17. The method of claim 16 wherein the securing step includes molding the second component to the first component.

18. A cutter for a tapping tee assembly comprising: a first component including a cutting edge for cutting through a side wall of a conduit to establish fluid communication between a main passage and the conduit; a second component secured to the first component, the second component includes an externally threaded region, a portion of the second component is positioned within the first component; and a seal member interposed between the first component and the second component to seal against potential gas bleed-by along an interface between the first and second components.

19. The cutter of claim 18 further comprising a retainer that at least partially encompasses the seal disposed between the first and second components.

* * * * *